United States Patent
Nguyen et al.

(10) Patent No.: US 7,071,738 B1
(45) Date of Patent: Jul. 4, 2006

(54) GLITCHLESS CLOCK SELECTION CIRCUIT USING PHASE DETECTION SWITCHING

(75) Inventors: Andy T. Nguyen, San Jose, CA (US); Shi-dong Zhou, Milpitas, CA (US)

(73) Assignee: Xilinx, Inc., San Jose, CA (US)

( * ) Notice: Subject to any disclaimer, the term of this patent is extended or adjusted under 35 U.S.C. 154(b) by 11 days.

(21) Appl. No.: 10/877,620

(22) Filed: Jun. 24, 2004

(51) Int. Cl.
*G06F 1/08* (2006.01)

(52) U.S. Cl. .................. 327/99; 327/144; 327/407

(58) Field of Classification Search .................. None
See application file for complete search history.

(56) References Cited

U.S. PATENT DOCUMENTS

| | | | |
|---|---|---|---|
| 4,893,319 A * | 1/1990 | Ziuchkovski | 375/362 |
| 5,274,678 A * | 12/1993 | Ferolito et al. | 375/357 |
| 6,429,698 B1 | 8/2002 | Young | |
| 6,639,449 B1 * | 10/2003 | De La Cruz et al. | 327/407 |
| 6,873,183 B1 * | 3/2005 | Kaviani et al. | 326/46 |
| 2003/0068000 A1 * | 4/2003 | Warren | 375/355 |
| 2003/0223522 A1 * | 12/2003 | Fukushima | 375/354 |
| 2004/0193975 A1 * | 9/2004 | Tarango et al. | 714/724 |
| 2005/0172193 A1 * | 8/2005 | Warren | 714/728 |

OTHER PUBLICATIONS

U.S. Appl. No. 10/436,781, filed May 12, 2003, Kaviani et al.
U.S. Appl. No. 10/453,235, filed Jun. 2, 2003, Vadi et al.
U.S. Appl. No. 10/837,329, filed Apr. 30, 2004, Vadi et al.

* cited by examiner

*Primary Examiner*—Timothy P. Callahan
*Assistant Examiner*—Cassandra Cox
(74) *Attorney, Agent, or Firm*—William L. Paradice, III; Justin Liu (57) ABSTRACT

A clock selection circuit includes an output multiplexer, control logic, and edge detection logic. The multiplexer includes inputs to receive multiple input clock signals, an output to generate the output clock signal, and a control terminal to receive a synchronized clock select signal. The control logic includes a first input to receive a clock select signal, a second input to receive a first control clock signal, a third input to receive a synchronization signal, and an output to selectively update the synchronized clock select signal with transitions in the clock select signal. The edge detection logic includes first inputs to receive the multiple input clock signals, a second input to receive a second control clock signal, and an output to generate the synchronization signal.

34 Claims, 11 Drawing Sheets

GLITCHLESS CLOCK SELECTION CIRCUIT USING PHASE DETECTION SWITCHING

FIELD OF INVENTION

The present invention relates generally to clock signals in integrated circuit (IC) devices, and more specifically to switching an output clock signal among multiple input clock signals in IC devices.

DESCRIPTION OF RELATED ART

It is desirable for an IC device to be able to operate using clock signals having different frequencies, for example, so that the device can communicate with other devices that utilize various different clock frequencies and to allow the device to use the fastest possible clock signal. Thus, many IC devices include a clock selection circuit that can switch the operating clock signal among multiple input clock signals that have different frequencies.

Figure 1:
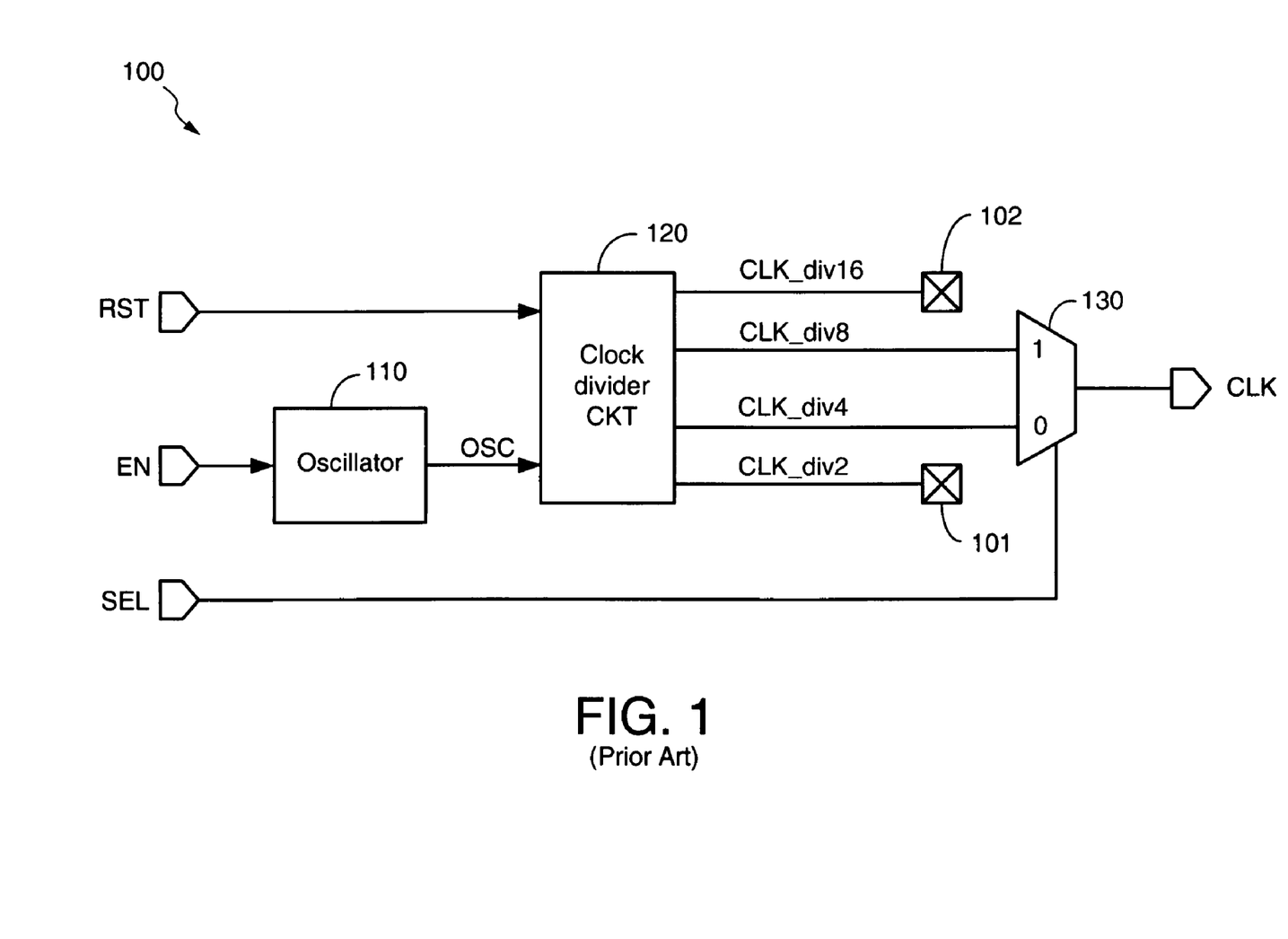
FIG. 1 is a circuit diagram of a prior art clock selection circuit.

FIG. 1 shows a prior art clock selection circuit 100 that includes an oscillator 110, a clock divider circuit 120, and a multiplexer (MUX) 130. Oscillator 110 can be any well-known oscillator (e.g., such as a ring oscillator) or circuit that generates an oscillating output signal OSC in response to an asserted enable signal EN. Clock divider circuit 120, which is well-known, includes inputs to receive OSC and a reset signal RST, and includes outputs to generate four clock signals CLK_div2, CLK_div4, CLK_div8, and CLK_div16 in response to OSC. As known in the art, CLK_div2 is a clock signal having one-half the frequency of OSC, CLK_div4 is a clock signal having one-fourth the frequency of OSC, CLK_div8 is a clock signal having one-eighth the frequency of OSC, and CLK_div16 is a clock signal having one-sixteenth the frequency of OSC. CLK_div4 and CLK_div8 are provided to corresponding inputs of MUX 130, which outputs either CLK_div4 or CLK_div8 as an output clock signal CLK in response to a clock select signal SEL. For example, when SEL is in a logic low state, MUX 130 outputs CLK_div4 as CLK, and when SEL is in a logic high state, MUX 130 outputs CLK_div8 as CLK. For simplicity, CLK_div2 and CLK_div16 are terminated in pads 101 and 102, respectively.

Figure 2:
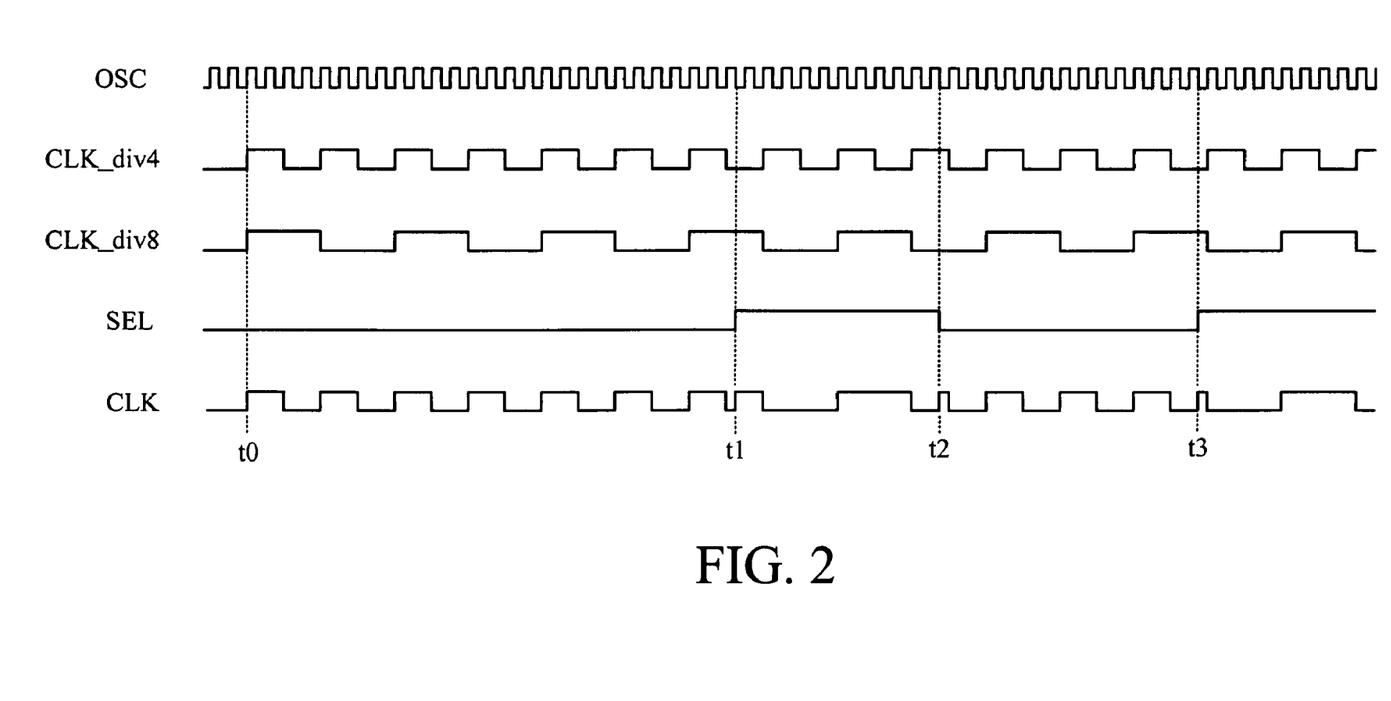
FIG. 2 is a timing diagram illustrating operation of the prior art clock selection circuit of FIG. 1.

Unfortunately, using MUX 130 to switch between input clock signals may generate unwanted glitches or false clocks that can cause abnormal behavior of associated circuitry (not shown for simplicity) that is clocked by CLK. For example, referring also to the timing diagram of FIG. 2, at time t0, SEL is logic low and causes MUX 130 to output CLK_div4 as CLK. At time t1, SEL is driven to logic high and causes MUX 130 to output CLK_div8 as CLK, thereby switching CLK from CLK_div4 to CLK_div8. However, because CLK_div4 and CLK_div8 are in opposite logic states at time t1, switching the input clock selection from CLK_div4 to CLK_div8 at time t1 generates a rising edge in CLK that is inconsistent with the frequency of either input clock signal. Thus, the rising edge in CLK at time t1 is a glitch that can cause associated circuitry clocked by CLK to function improperly, and in some instances, can cause the associated circuitry to fail. Similarly, because CLK_div4 and CLK_div8 are in opposite logic states at times t2 and t3, the logic state transitions of SEL at times t2 and t3 also generate undesirable glitches in CLK.

One solution to avoid generating unwanted glitches in CLK when switching CLK between different input clock signals is to halt or freeze CLK until the input clock signals are in phase with each other and then, after a predetermined time period sufficient to allow the newly selected clock signal to settle, outputting the newly selected clock signal as CLK. Although effective in preventing unwanted glitches in CLK during changes in the input clock signal selection, halting CLK when switching between different input clock signals also halts operation of any associated circuitry that is clocked by CLK, which can degrade performance of the associated circuitry.

Thus, there is a need for a clock selection circuit that can switch CLK among different input clock signals without producing undesirable glitches in CLK and without halting CLK during such clock switching operations.

SUMMARY

A clock selection circuit is disclosed that can switch an output clock signal among different input clock signals without producing undesirable glitches in the output clock signal and without halting the output clock signal during clock switching operations. In accordance with the present invention, a clock selection circuit eliminates glitches in the output clock signal when switching among different input clock signals without halting the output clock signal by allowing the output clock signal to switch between a previously selected input clock signal and a newly selected input clock signal only when corresponding edges of the two input clock signals are synchronous, e.g., only when the previously selected input clock signal and the newly selected input clock signal are in phase. The corresponding edges may be either rising edges or falling edges of the input clock signals.

For some embodiments, the clock selection circuit includes an output multiplexer, control logic, and edge detection logic. The output multiplexer includes inputs to receive multiple input clock signals, an output to generate the output clock signal, and a control terminal. The control logic includes a first input to receive a clock select signal, a second input to receive a synchronization signal, and an output coupled to the control terminal of the output multiplexer. The edge detection logic includes inputs to receive the multiple input clock signals, and an output to generate the synchronization signal. For some embodiments, the control logic includes an input to receive a first control clock signal. For some embodiments, the edge detection logic includes an input to receive a second control clock signal. For some embodiments, the input clock signals and the control clock signals are derived from the same oscillation signal. For one embodiment, the first control clock signal is one of the input clock signals, and the second control clock signal is the oscillation signal.

In operation, the edge detection logic samples the input clock signals using the second control clock signal and asserts the synchronization signal when corresponding edges of the previously selected input clock signal and the newly selected input clock signal are synchronous. The control logic samples the clock select signal using the first control clock signal to synchronize transitions in the clock select signal with the input clock signals. If the synchronization signal is asserted, the control logic allows the synchronized clock select signal to be updated with transitions in the clock select signal, which in turn causes the output multiplexer to output the newly selected input clock signal as the output clock signal. Otherwise, if the synchronization signal is not asserted, the control logic does not update the synchronized clock select signal with transitions in the clock select signal, which in turn causes the output multiplexer to continue to provide the previously selected input clock signal as the output clock signal.

BRIEF DESCRIPTION OF THE DRAWINGS

The features and advantages of the present invention are illustrated by way of example and are by no means intended to limit the scope of the present invention to the particular embodiments shown, and in which.

Like reference numerals refer to corresponding parts throughout the drawing figures.

DETAILED DESCRIPTION

The present invention is applicable to a variety of integrated circuits and systems, and is particularly useful for devices that require glitchless switching among different input clock signals without halting the output clock signal. Embodiments of the present invention are described below in the context of a clock divider circuit that generates four different clock signals in response to an oscillation signal for simplicity only. It is to be understood that embodiments of the present invention may be used to switch among any number of different clock signals generated in any suitable manner. In the following description, for purposes of explanation, specific nomenclature is set forth to provide a thorough understanding of the present invention. In other instances, well-known circuits and devices are shown in block diagram form to avoid obscuring the present invention. Further, the logic levels assigned to various signals in the description below are arbitrary, and thus can be modified (e.g., reversed polarity) as desired. Accordingly, the present invention is not to be construed as limited to specific examples described herein but rather includes within its scope all embodiments defined by the appended claims.

Figure 3:
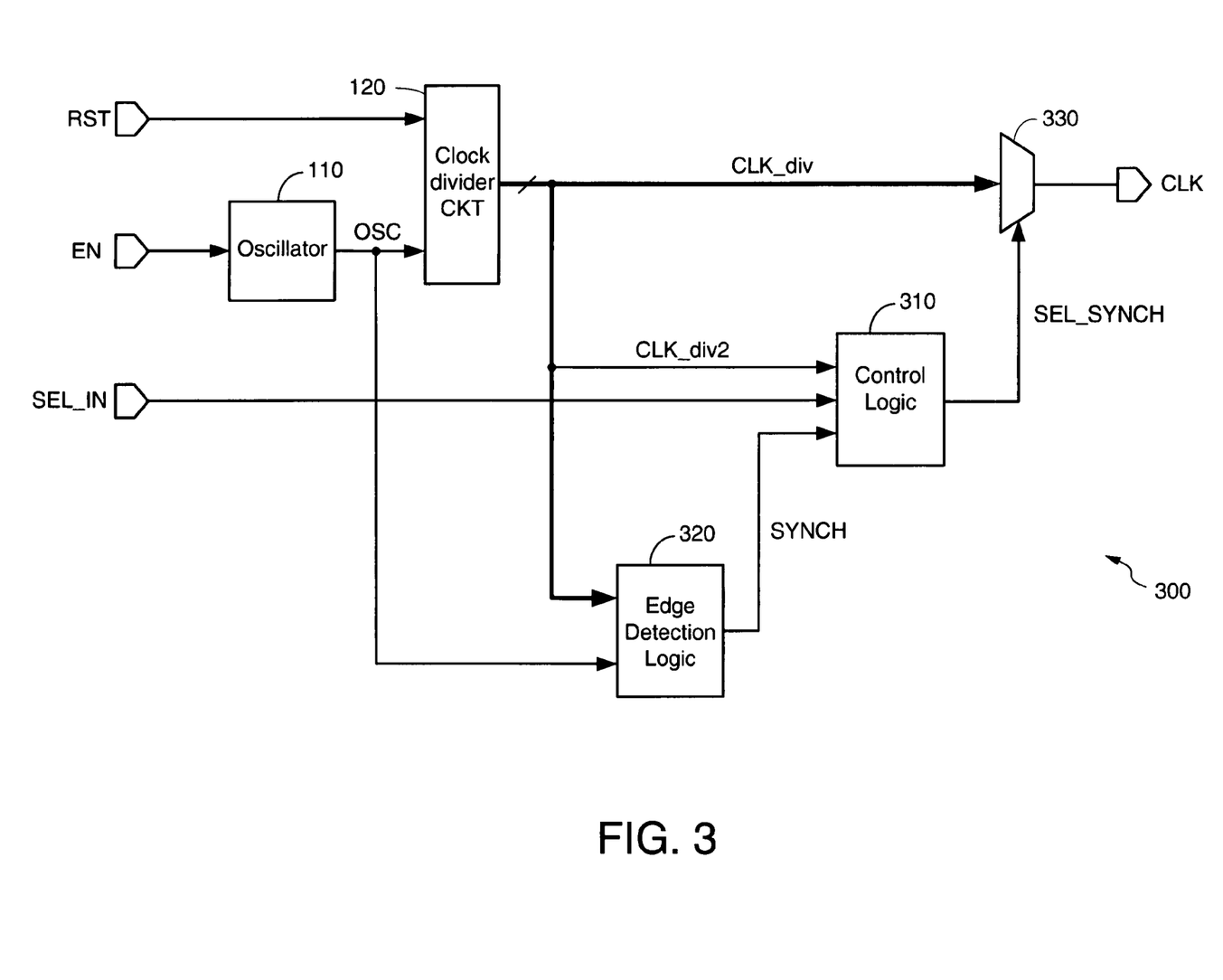
FIG. 3 is a block diagram of a clock selection circuit in accordance with the present invention.

FIG. 3 shows a block diagram of a clock selection circuit 300 in accordance with one embodiment of the present invention. Clock selection circuit 300 includes control logic 310, edge detection logic 320, and an output multiplexer (MUX) 330. Output MUX 330 is well-known, and includes inputs to receive a plurality of input clock signals CLK_div from clock divider circuit 120, an output to generate the output clock signal CLK, and a control terminal to receive a synchronized clock select signal SEL_SYNCH. As mentioned above, oscillator 110 may be any suitable circuit that generates an oscillation signal OSC, and clock divider circuit 120 may be any well-known circuit that generates a plurality of different clock signals in response to OSC. For some embodiments, clock selection circuit 300 may include oscillator 110 and clock divider circuit 120. For other embodiments, oscillator 110 and clock divider circuit 120 may be external to clock selection circuit 300. In yet other embodiments, some or all of the plurality of input clock signals may be generated by means other than a clock divider, such as an oscillator or an external source.

For simplicity, the plurality of input clock signals CLK_div are illustrated collectively in FIG. 3. The input clock signals can have any suitable frequencies. For some embodiments, each of the plurality of input clock signals has a frequency that is some fraction of OSC. For other embodiments, each of the plurality of input clock signals has a frequency that is some multiple of OSC. Further, for the exemplary embodiment illustrated in FIG. 3, CLK_div2 is used as a control clock signal for control logic 310, and OSC is used as a control clock signal for edge detection logic 320. For other embodiments, other clock signals can be used to control operation of control logic 310 and/or edge detection logic 320.

Edge detection logic 320 includes first inputs to receive the plurality of input clock signals CLK_div, a second input to receive OSC, and an output to generate a synchronization signal SYNCH. As described in more detail below, edge detection logic 320 is configured to assert SYNCH (e.g. to logic high) when corresponding edges of a previously selected input clock signal and a newly selected input clock signal are synchronous with each other, and to otherwise de-assert SYNCH (e.g., to logic low). For some embodiments, edge detection logic 320 asserts SYNCH when the rising edges of the previously selected input clock signal and the newly selected input clock signal are synchronous, and for other embodiments, edge detection logic 320 asserts SYNCH when the falling edges of the previously selected input clock signal and the newly selected input clock signal are synchronous. For some embodiments, edge detection logic 320 may assert SYNCH for a predetermined period of time.

Control logic 310 includes inputs to receive an input clock select signal SEL_IN, CLK_div2, and SYNCH, and includes an output to provide the synchronized clock select signal SEL_SYNCH to the control terminal of output MUX 330. CLK_div2 is used to clock the logic state of SEL_IN into control logic 310, although for other embodiments, other clock signals such as OSC may be used. As described in more detail below, control logic 310 is configured to update SEL_SYNCH with logic state changes in SEL_IN only when SYNCH is asserted by edge detection logic 320. In this manner, control logic 310 instructs output MUX 330 to switch CLK from the previously selected input clock signal to the newly selected input clock signal only when corresponding edges of the two input clock signals are synchronous, thereby eliminating glitches in CLK during changes in the input clock signal selection without halting CLK.

Figure 4:
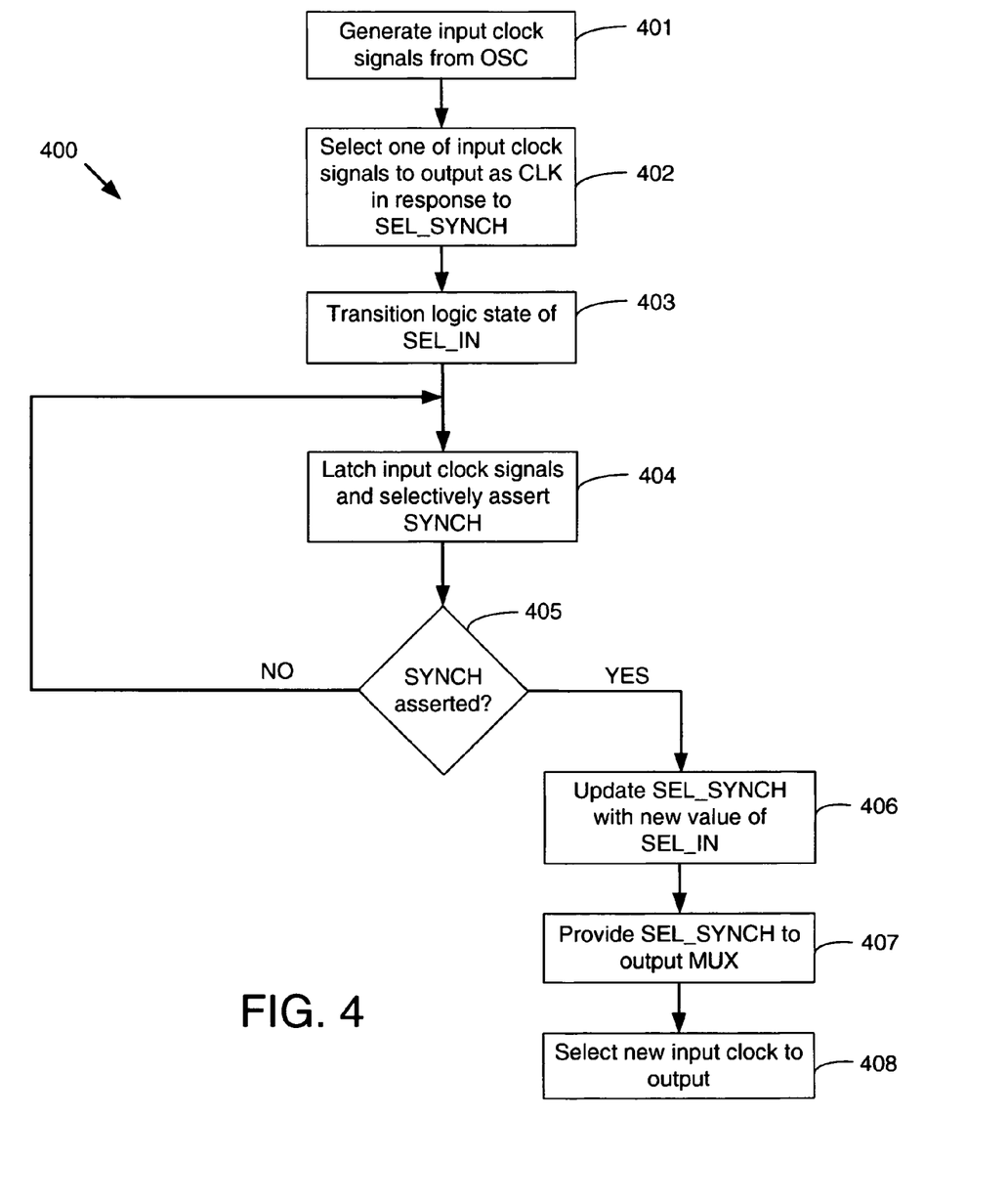
FIG. 4 is a flow chart illustrating an exemplary clock switching operation for one embodiment of the clock selection circuit of FIG. 3.

An exemplary clock switching operation of clock selection circuit 300 is described below with respect to the flow chart of FIG. 4. For this example, SEL_IN and SEL_SYNCH are initialized to a first logic value. When EN is asserted, oscillator 110 generates OSC, which in turn is used by clock divider circuit 120 to generate the plurality of input clock signals CLK_div in a well-known manner (401). The first logic value of SEL_SYNCH causes output MUX 330 to select a first input clock signal to output as CLK (402). To change the input clock selection from the first input clock signal to a second input clock signal, SEL_IN is transitioned from the first logic value to a second logic value, which in turn is latched into control logic 310 using CLK_div2 (403). Using OSC to sample the first and second input clock signals, edge detection logic 320 determines whether corresponding edges of the first and second input clock signals are synchronous, and in response thereto selectively asserts SYNCH (404). If SYNCH is asserted, as tested at 405, control logic 310 updates SEL_SYNCH with the new latched value of SEL_IN (406), which in turn is provided to the control terminal of output MUX 330 (407). In response thereto, output MUX 330 outputs the second input clock signal as CLK (408). Conversely, if SYNCH is de-asserted at 405, control logic 310 does not update SEL_SYNCH, and processing proceeds to 404.

Thus, in accordance with the present invention, control logic 310 allows SEL_SYNCH to be updated with logic state changes in SEL_IN to switch the input clock selection only when corresponding edges of the previously selected input clock signal and the newly selected input clock signal are synchronous. As explained in more detail below, by allowing output MUX 330 to switch among input clock selections only during a short time interval after the detection of synchronous corresponding edges of the previously selected input clock signal to the newly selected input clock signal, clock selection circuit 300 is able to switch CLK from one input clock selection to another without generating unwanted glitches in CLK and without halting or otherwise locking the logic state of CLK. In this manner, associated circuitry that is clocked by CLK does not have to halt its operation during changes in the input clock selection. Accordingly, embodiments of the present invention are advantageous over prior art clock selection circuits that halt CLK during clock switching operations.

Figure 5A:
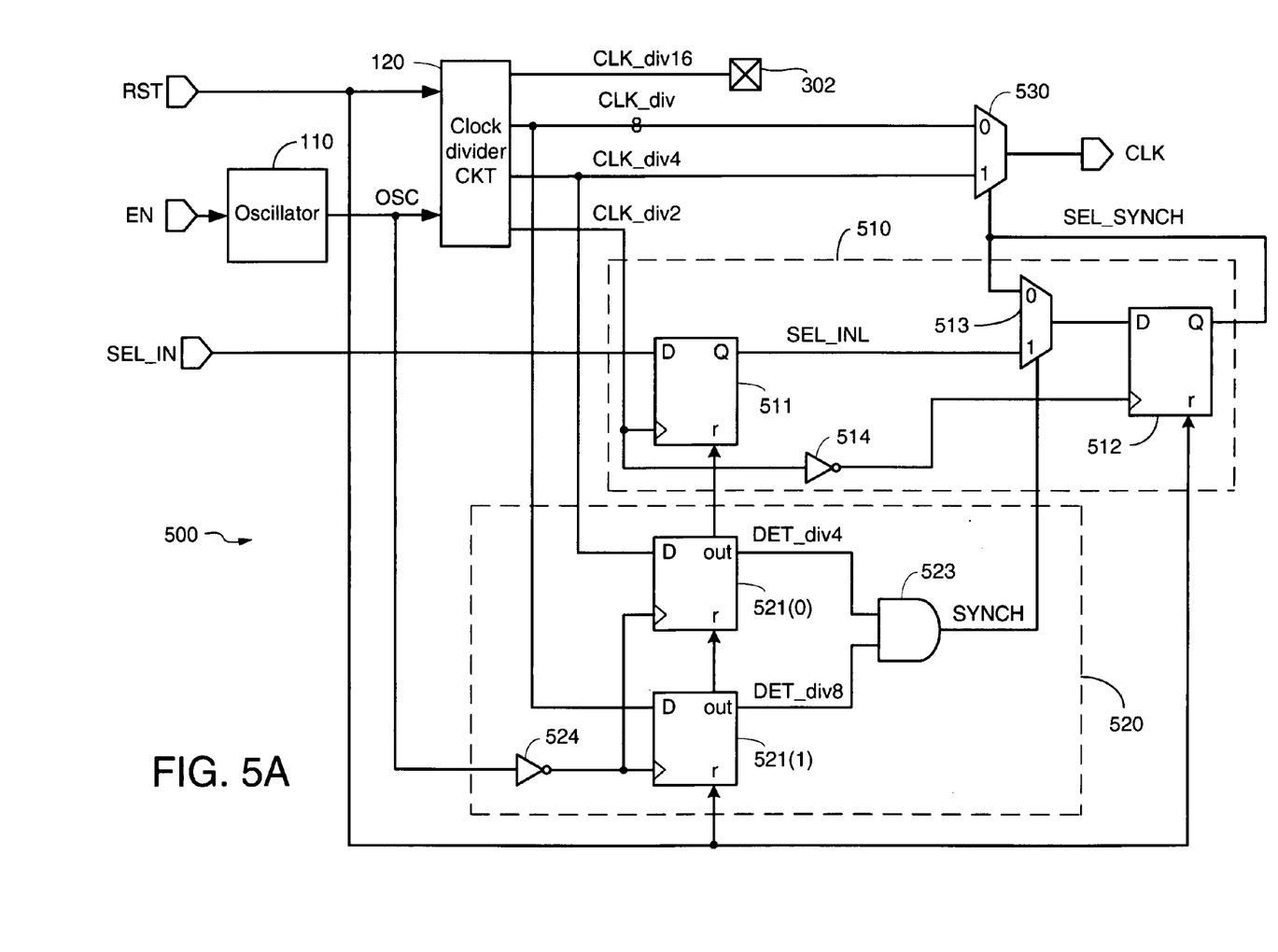
FIG. 5A is a more detailed block diagram of a clock selection circuit that is one embodiment of the clock selection circuit of FIG. 3.

FIG. 5A shows a clock selection circuit 500 configured to switch an output clock signal CLK between two input clock signals CLK_div4 and CLK_div8. Clock selection circuit 500, which is one embodiment of clock selection circuit 300 of FIG. 3, is shown coupled to oscillator 110 and clock divider circuit 120, and includes control logic 510, edge detection logic 520, and an output MUX 530. Output MUX 530 includes a first input to receive CLK_div8, a second input to receive CLK_div4, an output to provide CLK, and a control terminal to receive SEL_SYNCH. For the exemplary embodiment of FIG. 5A, CLK_16 is terminated in a pad 302. For other embodiments, clock selection circuit 500 may be used to switch CLK among other input clock signals.

Control logic 510, which is one embodiment of control logic 310 of FIG. 3, includes latches 511–512, a MUX 513, and an inverter 514. Latch 511 includes a data input to receive SEL_IN, a clock input to receive CLK_div2, a reset terminal to receive RST, and an output to provide a latched clock select signal SEL_INL to a first input of MUX 513. Latch 512 includes a data input coupled to the output of MUX 513, a clock input to receive a complement CLK_div2 generated by inverter 514, a reset terminal to receive RST, and an output to provide SEL_SYNCH to a second input of MUX 513 and to the control terminal of output MUX 530. The control terminal of MUX 513 receives SYNCH from edge detection logic 520. Together, MUX 513 and latch 512 maintain SEL_SYNCH in its current logic state when SYNCH is de-asserted to logic low, and update SEL_SYNCH with the current logic state of SEL_INL when SYNCH is asserted to logic high.

Latches 511–512 may be any suitable circuit that latches the logic state of its input signal in response to its control clock signal, and inverter 514 may be any suitable logical inversion circuit. For some embodiments, latches 511–512 are D-type flip-flops, and inverter 514 is a CMOS inverter. For other embodiments, other circuits may be used for latches 511–512 and for inverter 514.

Edge detection logic 520 includes edge detection circuits 521(0)–521(1), an AND gate 523, and an inverter 524. Edge detection circuit 521(0) includes a data input to receive CLK_div4, a clock input to receive the complement of OSC generated by inverter 524, a reset terminal to receive RST, and an output coupled to a first input of AND gate 523. Edge detection circuit 521(0) samples CLK_div4 on the falling edges of OSC and asserts DET_div4 (e.g., to logic high) for a predetermined time when a rising edge of CLK_div4 is detected. Edge detection circuit 521(1) includes a data input to receive CLK_div8, a clock input to receive the complement of OSC, a reset terminal to receive RST, and an output coupled to a second input of AND gate 523. Edge detection circuit 521(1) samples CLK_div8 on the falling edges of OSC and asserts DET_div8 (e.g., to logic high) for a predetermined time when a rising edge of CLK_div8 is detected. AND gate 523, which includes an output coupled to the control terminal of MUX 513, asserts SYNCH to logic high when both DET_div4 and DET_div8 are asserted, and de-asserts SYNCH when either DET_div4 or DET_div8 is de-asserted. For other embodiments, edge detection circuits 521(0) and 521(1) may be configured to detect falling edges of CLK_div4 and CLK_div8, respectively.

An exemplary clock switching operation of clock selection circuit 500 is described below with reference to the timing diagram of FIG. 6. Upon power-up of clock selection circuit 500, RST is briefly asserted to initialize clock divider circuit 120 to a known state, and to initialize the outputs of latches 511–512 and the outputs of edge detection circuits 521(0)–521(1) to logic low. Thus, at time t0, SEL_SYNCH, DET_div4, DET_div8, and SYNCH are all logic low. The logic low state of SYNCH causes MUX 513 to provide SEL_SYNCH back to the data input of latch 512, thereby maintaining SEL_SYNCH in its initialized logic low state so that MUX 530 initially outputs CLK_div8 as CLK.

At time t1, the rising edge of OSC generates synchronous rising edges in CLK_div2, CLK_div4, CLK_div8, and CLK_div16, which as mentioned above are all derived from OSC. The rising edge of CLK_div2 clocks SEL_IN into latch 511, thereby synchronizing state changes in SEL_IN with the input clock signals CLK_div4 and CLK_div8. The latched value of SEL_IN is provided to the I1 input of MUX 513 as SEL_INL.

At time t2, the falling edge of OSC causes edge detection circuit 521(0) to sample the logic high state of CLK_div4 and causes edge detection circuit 521(1) to sample the logic high state of CLK_div8. Upon detecting the rising edge of CLK_div4, edge detection circuit 521(0) asserts DET_div4 to logic high. Similarly, upon detecting the rising edge of CLK_div8, edge detection circuit 521(1) asserts DET_div8 to logic high. In response to the simultaneous assertion of DET_div4 and DET_div8, AND gate 523 asserts SYNCH to logic high, which causes MUX 513 to propagate the latched clock select signal SEL_INL to the data input of latch 512.

At time t3, the falling edge of CLK_div2 causes latch 512 to latch SEL_INL and thereby update SEL_SYNCH with the current value of SEL_INL. Because SEL_INL is logic low, latch 512 maintains SEL_SYNCH in its logic low state, and in response thereto, output MUX 530 continues to output CLK_div8 as CLK.

At time t4, the falling edge of OSC causes edge detection circuits 521(0) and 521(1) to sample the logic states of CLK_div4 and CLK_div8, respectively. In response thereto, edge detection circuit 521(0) determines that there is not a rising edge of CLK_div4 at time t4, and de-asserts DET_div4 to logic low. Similarly, edge detection circuit 521(1) determines that there is not a rising edge of CLK_div8 at time t4, and de-asserts DET_div8 to logic low. The de-asserted logic low states of DET_div4 and DET_div8 cause AND gate 523 to de-assert SYNCH to logic low, which in turn causes control logic 510 to prevent logic state changes in SEL_SYNCH.

At time t5, the falling edge of OSC causes edge detection circuit 521(0) to sample the logic low state of CLK_div4 and causes edge detection circuit 521(1) to sample the logic low state of CLK_div8. In response thereto, edge detection circuits 521 and 522 assert DET_div4 and DET_div8, respectively, to logic low, thereby causing AND gate 523 to maintain SYNCH in its logic low state. The logic low state of SYNCH causes MUX 513 to continue providing a logic low SEL_SYNCH to MUX 530 via latch 512.

Just after time t5, SEL_IN is transitioned from logic low to logic high to switch the input clock selection from CLK_div8 to CLK_div4. At time t6, OSC, CLK_div2, CLK_div4, CLK_div8, and CLK_div16 simultaneously transition from logic low to logic high. The rising edge of CLK_div2 causes latch 511 to latch the logic high state of SEL_IN, which is provided as a logic high SEL_INL to the I1 input of MUX 513.

At time t7, the falling edge of OSC causes edge detection circuit 521(0) to sample the logic high state of CLK_div4 and causes edge detection circuit 521(1) to sample the logic high state of CLK_div8. Upon detecting the rising edge of CLK_div4, edge detection circuit 521(0) asserts DET_div4 to logic high. Similarly, upon detecting the rising edge of CLK_div8, edge detection circuit 521(1) asserts DET_div8 to logic high. In response to the simultaneous assertion of DET_div4 and DET_div8, AND gate 523 asserts SYNCH to logic high, which causes MUX 513 to propagate SEL_INL to the data input of latch 512.

At time t8, the falling edge of CLK_div2 clocks the logic high state of SEL_INL into latch 512, thereby updating SEL_SYNCH with the logic high state of SEL_INL. The resultant logic high state of SEL_SYNCH causes output MUX 530 to select CLK_div4 to output as CLK, thereby switching the output from CLK_div8 to CLK_div4 just after time t8. At time t9, the falling edge of OSC causes edge detection circuits 521 and 522 to again sample CLK_div4 and CLK_div8, respectively. Because there are not rising edges for either CLK_div4 or CLK_div8 at time t9, DET_div4 and DET_div8 are both de-asserted to logic low, which in turn causes AND gate 523 to de-assert SYNCH.

Clock selection circuit 500 continues to output CLK_div4 as CLK until SEL_SYNCH is updated with the next logic transition of SEL_IN, which causes output MUX 530 to output CLK_div8 as CLK in the manner described above.

Figure 6:
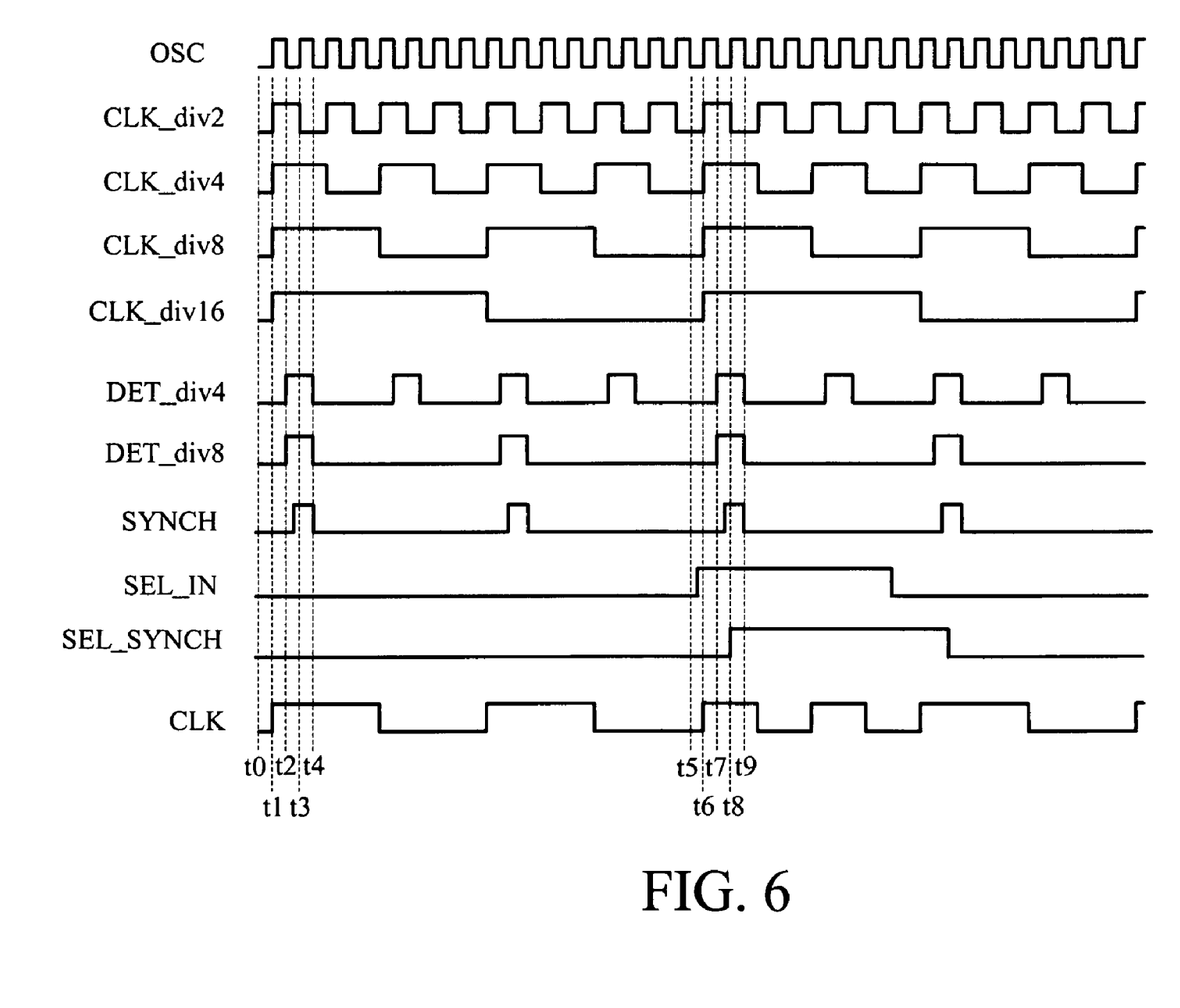
FIG. 6 is a timing diagram illustrating an exemplary operation of one embodiment of the clock selection circuit of FIG. 5A.

As illustrated in the timing diagram of FIG. 6, clock selection circuit 500 is able to switch the input clock selection from CLK_div8 to CLK_div4 in response to logic state changes in SEL_IN without producing any unwanted glitches or false clock pulses in the output clock signal CLK and without halting CLK. Edge detection logic 520 asserts SYNCH to allow control logic 510 to update SEL_SYNCH with logic state changes in SEL_IN during a predetermined time period following the detection of synchronous rising edges of CLK_div4 and CLK_div8. As described above and illustrated in the timing diagram of FIG. 6, the predetermined time period during which SYNCH is asserted is approximately equal to the pulse width (e.g., approximately one-half the clock period) of OSC. In this manner, edge detection logic 520 ensures that output MUX 530 switches between input clock selections only during approximately the first half of the clock period of OSC after the detection of synchronous rising edges of CLK_div4 and CLK_div8, thereby allowing sufficient time for changes in the input clock selection to settle while both CLK_div4 and CLK_div8 are logic high.

Further, note that logic state changes in SEL_IN are captured in latch 511 on a rising edge of CLK_div2, and that SEL_SYNCH is updated with the new value of SEL_INL on the next falling edge of CLK_div2 via latch 512, thereby ensuring that SEL_SYNCH is updated during the middle of the asserted DET_div4 and DET_div8 pulses. In this manner, logic state changes in SEL_IN that occur after the falling edge of CLK_div2 do not update SEL_SYNCH on the next falling edge of CLK_div2, thereby ensuring that output MUX 530 does not switch input clock selections more than one half of the clock period of OSC after the detection of synchronous rising edges in CLK_div4 and CLK_div8.

For other embodiments, AND gate 523 may include an additional input to receive an active-low disable signal (not shown in FIG. 5A for simplicity) that prevents SYNCH from being asserted. For example, when the disable signal is asserted (e.g., to logic low), the output of AND gate 523 is forced to logic low, which in turn causes MUX 513 to prevent latch 512 from receiving any logic state changes in SEL_IN. Conversely, when the disable signal is de-asserted (e.g., to logic high), AND gate 523 drives SYNCH in response to DET_div4 and DET_div8, as described above.

Figure 5B:
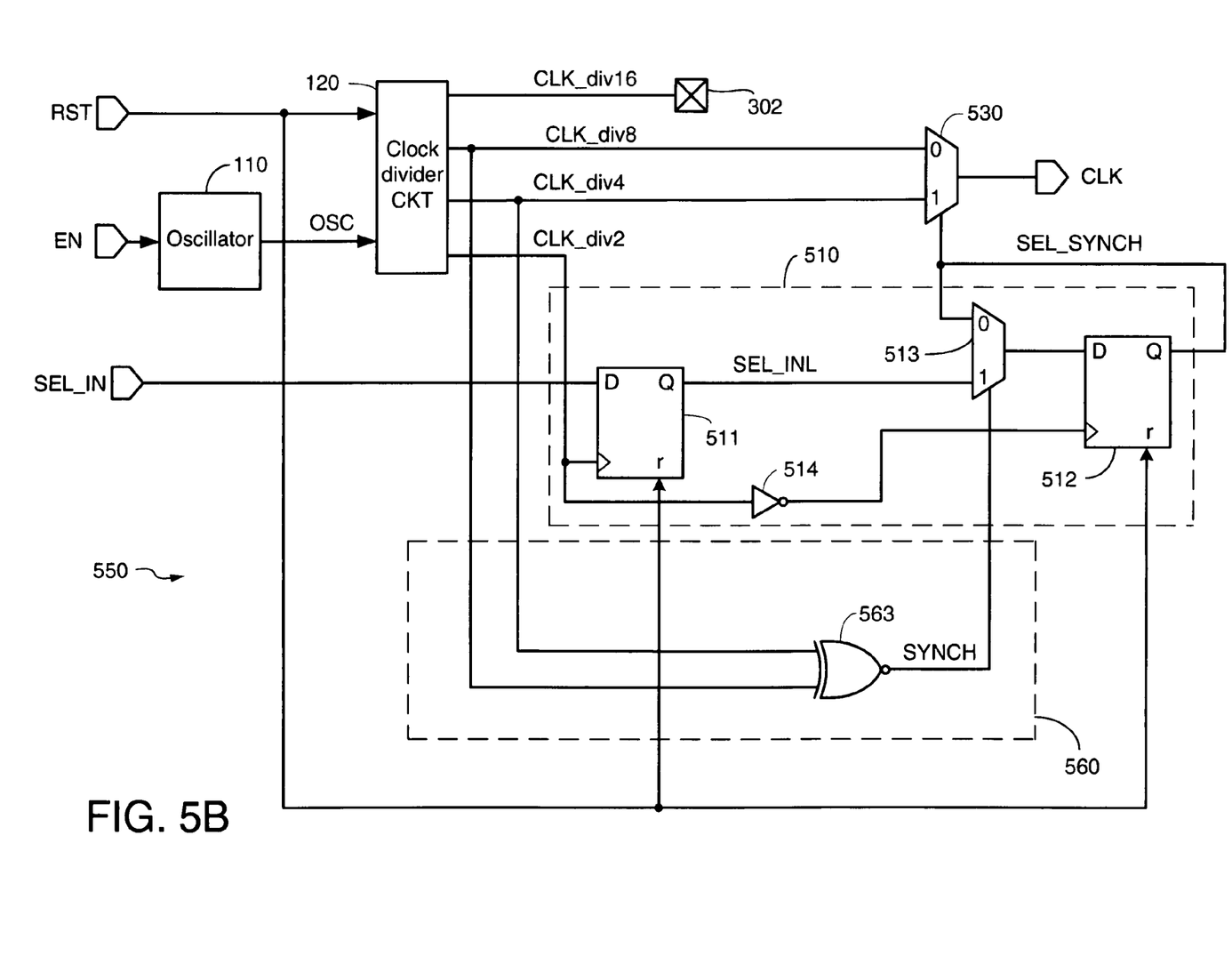
FIG. 5B is a more detailed block diagram of a clock selection circuit that is another embodiment of the clock selection circuit of FIG. 3.

FIG. 5B shows a clock selection circuit 550 that is another embodiment of clock selection circuit 300 of FIG. 3. Clock selection circuit 550, which is shown coupled to oscillator 110 and clock divider circuit 120, includes output MUX 530, control logic 510, and edge detection logic 560. Edge detection logic 560 includes an exclusive-NOR gate (XNOR) 563 having a first input to receive CLK_div4, a second input to receive CLK_div8, and an output to generate SYNCH. Operation of clock selection circuit 560 is similar to that of clock selection circuit 500, except that edge detection logic 520 of FIG. 5A is a synchronous circuit clocked by OSC, and edge detection logic 560 of FIG. 5B is an asynchronous circuit. Although the embodiment of FIG. 5B consumes less circuit area than the embodiment of FIG. 5A, the embodiment of FIG. 5A may provide better clock switching characteristics. For example, while edge detection logic 560 (e.g., XNOR gate 563) of FIG. 5B asserts SYNCH to logic high to allow SEL_SYNCH to be updated with logic state changes in SEL_INL when CLK_div4 and CLK_div8 are in the same logic state, edge detection logic 520 asserts SYNCH to allow SEL_SYNCH to be updated with logic state changes in SEL_INL only when CLK_div4 and CLK_div8 have synchronous rising edges, thereby ensuring that output MUX 530 does not switch CLK from the previously selected input clock signal to the newly selected input clock signal unless there is sufficient time for the newly selected clock signal to settle.

Figure 7:
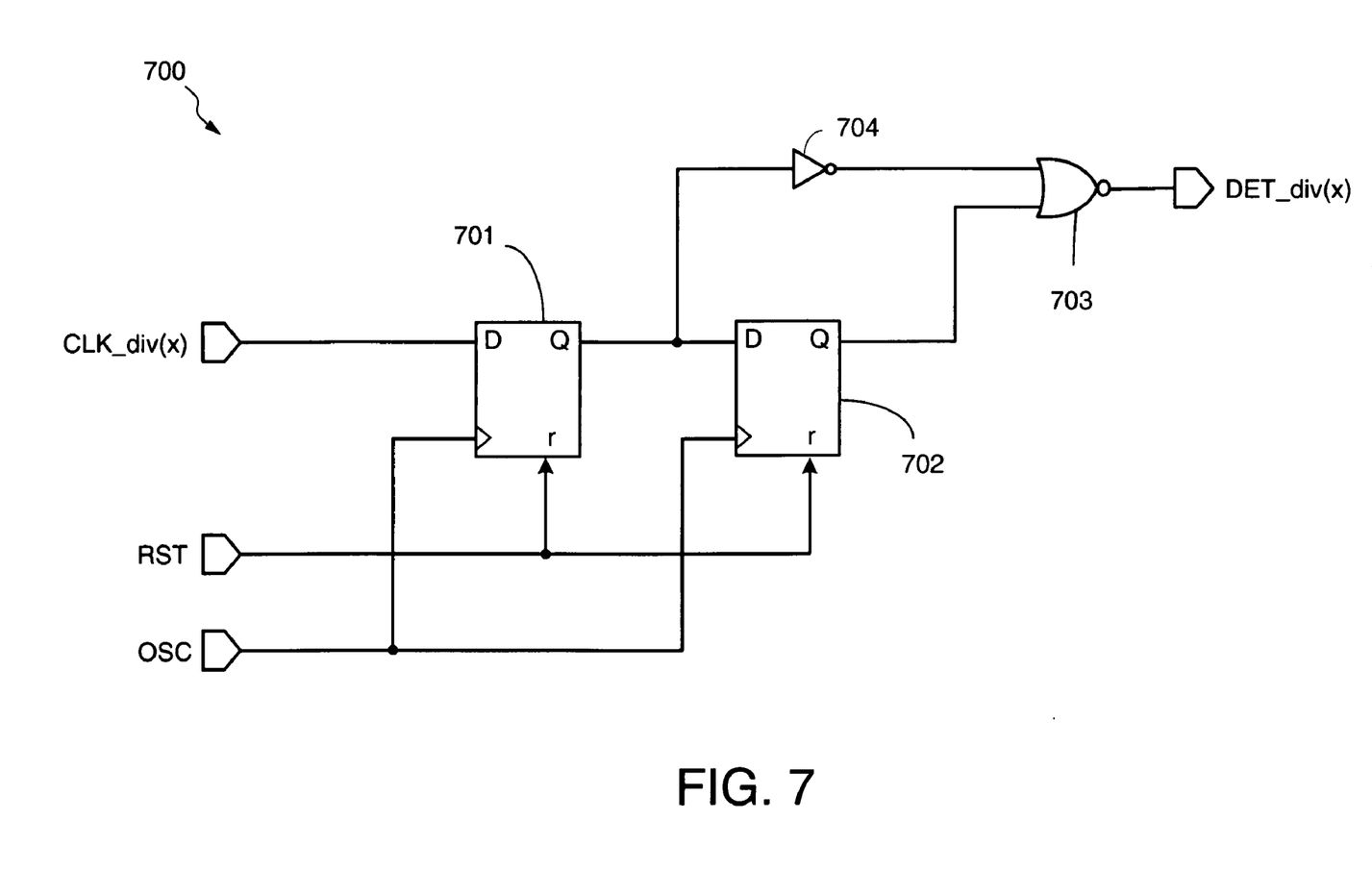
FIG. 7 is a circuit diagram of one embodiment of the edge detection circuit of FIG. 5A.

FIG. 7 shows an edge detection circuit 700 that is one embodiment of edge detection circuits 521(0)–521(1) of FIG. 5. Edge detection circuit 700 includes latches 701–702, a NOR gate 703, and an inverter 704. Latch 701 includes a data input to receive a corresponding input clock signal CLK_div(x), a clock input to receive OSC (or an inverted version of OSC), a reset terminal to receive RST, and an output coupled to the data input of latch 702. Latch 702 has a clock input to receive OSC, a reset terminal to receive RST, and an output coupled to a first input of NOR gate 703. Inverter 704 is coupled between the output of latch 701 and a second input of NOR gate 703, which includes an output to generate a corresponding edge detection signal DET_div (x). Latches 701 and 702 may be any suitable circuit that latches the logic state of CLK_div(x) in response to OSC. For some embodiments, latches 701 and 702 are D-type flip flops, and inverter 704 is a well-known CMOS inverter. For other embodiments, other circuits may be used for latches 701–702 and for inverter 704.

In operation, each rising edge of OSC latches the current value of CLK_div(x) into latch 701 and latches the previous value of CLK_div(x) from latch 701 into latch 702. The previous value of CLK_div(x) and the complement of the current value of CLK_div(x) are combined in NOR gate 703 to generate DET_div(x). Thus, edge detection circuit 700 asserts DET_div(x) to indicate detection of a rising edge of CLK_div(x) when the previous value of CLK_div(x) is logic low and the current value of CLK_div(x) is logic high. All other combinations of the logic states for the previous and current values of CLK_div(x) produce a de-asserted logic low value for DET_div(x).

The embodiment of FIG. 7 may be modified to assert DET_div(x) upon detecting a falling edge of CLK_div(x) by removing inverter 704 from between the output of latch 701 and NOR gate 703 and inserting an inverter between the output of latch 702 and NOR gate 703. For such modified embodiments, NOR gate 703 asserts DET_div(x) to logic high only when the previous value of CLK_div(x) is logic high and the current value of CLK_div(x) is logic low.

Figure 8A:
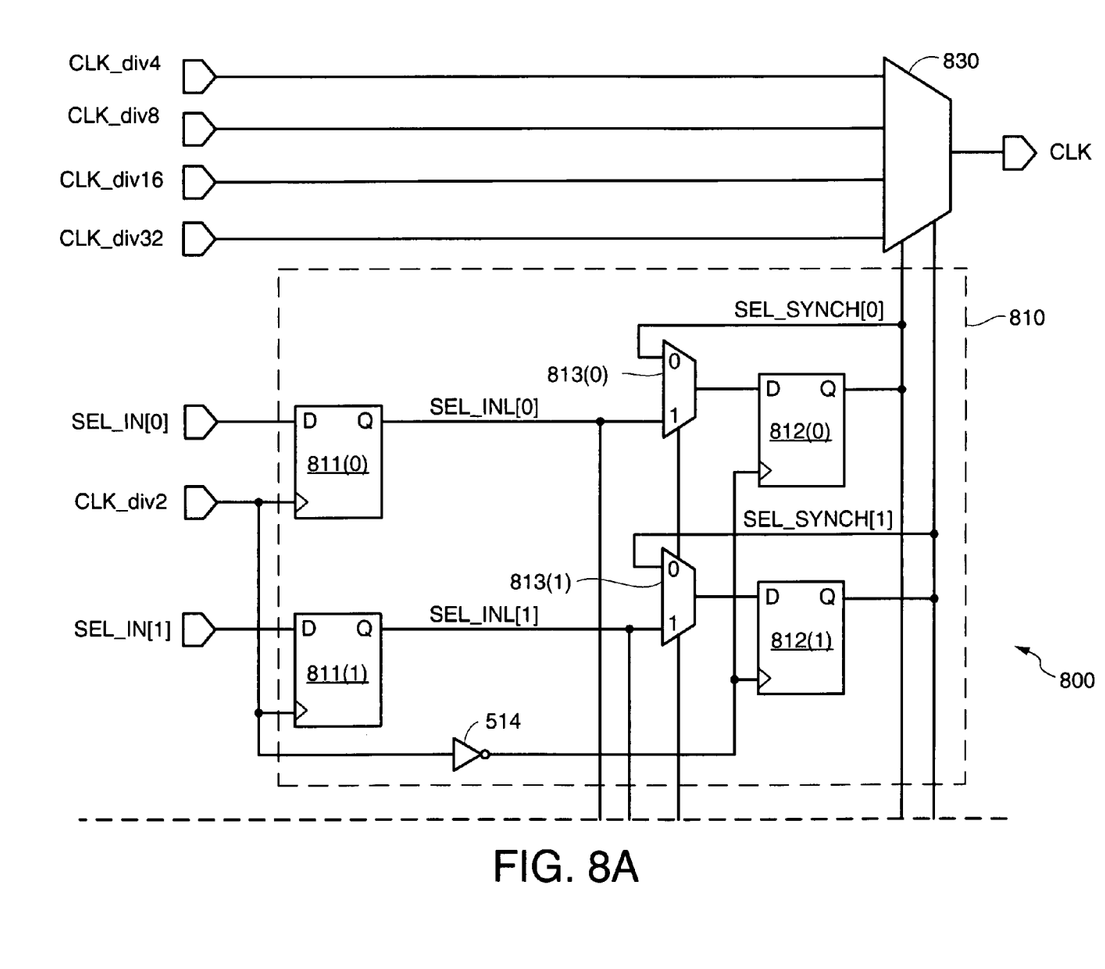
FIG. 8 is a more detailed block diagram of a clock selection circuit that is another embodiment of the clock selection circuit of FIG. 3.
Figure 8B:
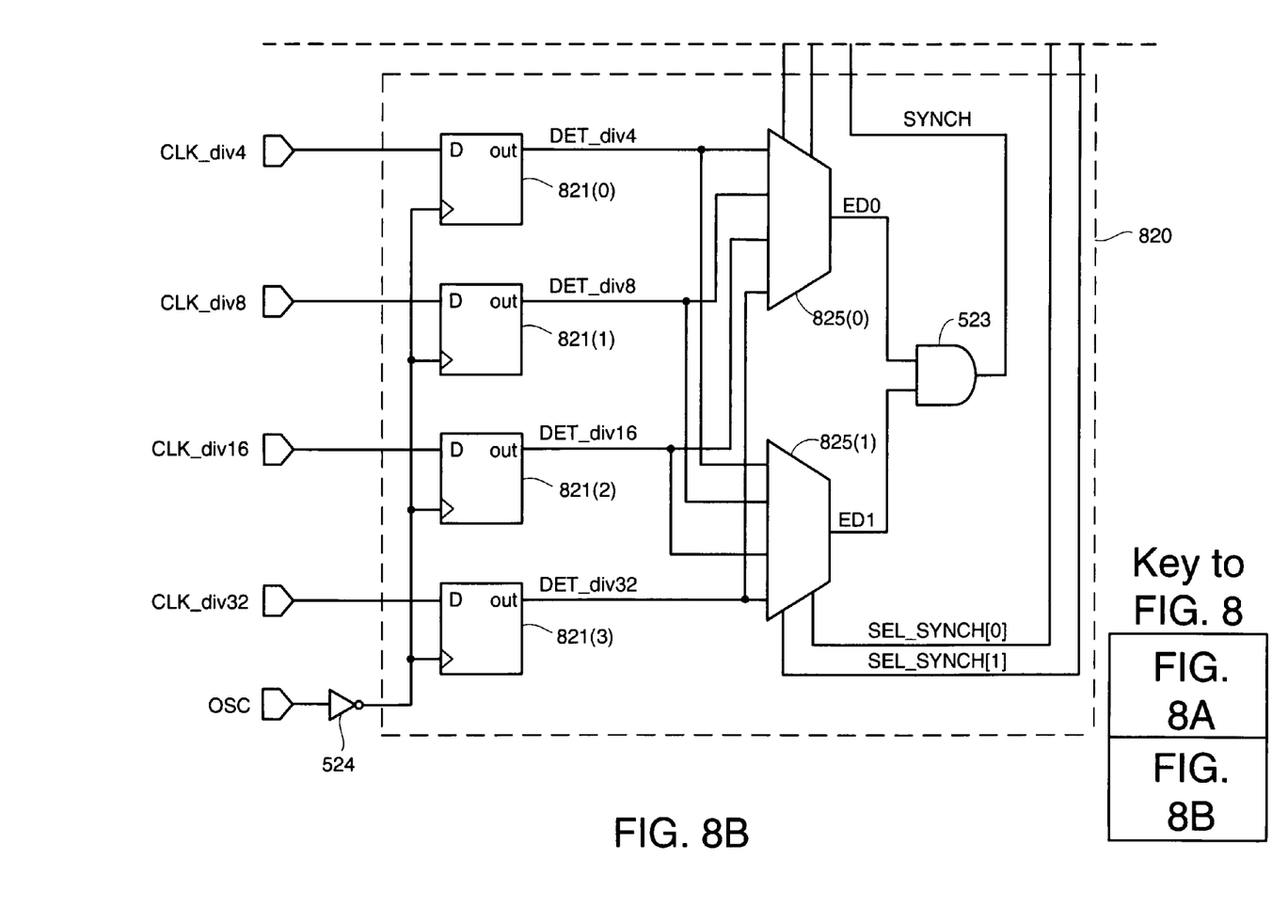

Embodiments of the present invention can be readily modified to switch an output clock signal among more than two input clock signals. For example, FIG. 8 shows an exemplary clock selection circuit 800 configured to switch CLK among four input clock signals CLK_div4, CLK_div8, CLK_div16, and CLK_32, although for other embodiments the clock selection circuit may be modified in accordance with the present invention to switch among any suitable number of clock signals. Clock selection circuit 800, which is another embodiment of clock selection circuit 300 of FIG. 3, operates in a manner similar to that of clock selection circuit 500 of FIG. 5. Clock selection circuit 800 includes control logic 810, edge detection logic 820, and an output MUX 830. Output MUX 830 includes four inputs to receive CLK_div4, CLK_div8, CLK_div16, and CLK_32, an output to generate CLK, and a control terminal to receive a 2-bit synchronized clock select signal SEL_SYNCH[1:0].

For the exemplary embodiment of FIG. 8, where control logic 810 uses CLK_div2 as its control clock signal and edge detection logic 820 uses OSC as its control clock signal, CLK_div2, CLK_div4, CLK_div8, CLK_div16, and CLK_32 are clock signals that are generated from the same oscillation signal OSC. For example, although not shown in FIG. 8 for simplicity, for some embodiments of clock selection circuit 800, CLK_div2, CLK_div4, CLK_div8, CLK_div16, and CLK_32 may be generated from OSC using a well-known clock divider circuit such as clock divider circuit 120. For other embodiments, clock selection circuit 800 may be configured to switch CLK among other input clock signals.

Control logic 810, which is another embodiment of control logic 310 of FIG. 3, includes latches 811(0), 811(1), 812(0), and 812(1), MUXes 813(0) and 813(1), and inverter 514. Latch 811(0) includes a data input to receive SEL_IN [0], a clock input to receive CLK_div2, and an output to provide the latched clock select signal SEL_INL[0] to a first input of MUX 813(0). Latch 812(0) includes a data input coupled to the output of MUX 813(0), a clock input to receive the complement of CLK_div2 via inverter 514, and an output to provide a first bit of the synchronized clock select signal SEL_SYNCH[0] to a second input of MUX 813(0) and to the control terminal of output MUX 830. The control terminal of MUX 813(0) receives SYNCH from edge detection logic 820. Together, MUX 813(0) and latch 812(0) maintain SEL_SYNCH[0] in its current logic state when SYNCH is de-asserted to logic low, and update SEL_SYNCH[0] with the current logic state of SEL_INL[0] when SYNCH is asserted to logic high. Latch 811(1) includes a data input to receive SEL_IN[1], a clock input to receive CLK_div2, and an output to provide the latched clock select signal SEL_INL[1] to a first input of MUX 813(1). Latch 812(1) includes a data input coupled to the output of MUX 813(1), a clock input to receive the complement of CLK_div2 via inverter 514, and an output to provide a second bit of the synchronized clock select signal SEL_SYNCH[1] to a second input of MUX 813(1) and to the control terminal of output MUX 830. The control terminal of MUX 813(1) receives SYNCH from edge detection logic 820. Together, MUX 813(1) and latch 812(1) maintain SEL_SYNCH[1] in its current logic state when SYNCH is de-asserted to logic low, and update SEL_SYNCH[1] with the current logic state of SEL_INL[1] when SYNCH is asserted to logic high.

Latches 811(0), 811(1), 812(0), and 812(1) may be any suitable circuit that latches the logic state of its input signal in response to its control clock signal. For simplicity, the reset terminals of latches 811(0), 811(1), 812(0), and 812(1), all of which may receive RST, are not shown in FIG. 8. For some embodiments, latches 811(0)–811(1) and 812(0)–812(1) are D-type flip-flops. For other embodiments, other circuits may be used for latches 811(0)–811(1) and 812(0)–812(1).

Edge detection logic 820 includes edge detection circuits 821(0)–821(3), MUXes 825(0) and 825(1), AND gate 523, and inverter 524. Edge detection circuit 821(0), which includes a first input to receive CLK_div4, a second input to receive the complement of OSC generated by inverter 524, and an output coupled to first inputs of MUXes 825(0) and 825(1), samples CLK_div4 on the falling edges of OSC and asserts DET_div4 (e.g., to logic high) for a predetermined time when a rising edge of CLK_div4 is detected. Edge detection circuit 821(1), which includes a first input to receive CLK_div8, a second input to receive the complement of OSC, and an output coupled to second inputs of MUXes 825(0) and 825(1), samples CLK_div8 on the falling edges of OSC and asserts DET_div8 (e.g., to logic high) for a predetermined time when a rising edge of CLK_div8 is detected. Edge detection circuit 821(2), which includes a first input to receive CLK_div16, a second input to receive the complement of OSC, and an output coupled to third inputs of MUXes 825(0) and 825(1), samples CLK_div16 on the falling edges of OSC and asserts DET_div16 (e.g., to logic high) for a predetermined time when a rising edge of CLK_div16 is detected. Edge detection circuit 821(3), which includes a first input to receive CLK_div32, a second input to receive the complement of OSC, and an output coupled to fourth inputs of MUXes 825(0) and 825(1), samples CLK_div32 on the falling edges of OSC and asserts DET_div32 (e.g., to logic high) for a predetermined time when a rising edge of CLK_div32 is detected.

For simplicity, the reset terminals of edge detection circuits 821(0)–821(3), all of which may receive RST, are not shown in FIG. 8. For some embodiments, edge detection circuit 700 of FIG. 7 is used for edge detection circuits 821(0)–821(3), although for other embodiments other suitable edge detection circuits may be used for edge detection circuits 821(0)–821(3).

MUX 825(0) includes control terminals to receive SEL_INL[0] and SEL_INL[1], and an output coupled to a first input of AND gate 523. MUX 825(1) includes control terminals to receive SEL_SYNCH[0] and SEL_SYNCH[1], and an output coupled to a second input of AND gate 523. AND gate 523, which includes an output to provide SYNCH to the control terminals of MUXes 813(0) and 813(1), asserts SYNCH to logic high when MUXes 825(0) and 825(1) simultaneously assert their respective output signals ED0 and ED1 to logic high, thereby allowing SEL_SYNCH to be updated with SEL_INL when the previously selected clock signal has a synchronous rising edge with the newly selected clock signal. Otherwise, if either ED0 or ED1 is de-asserted to logic low, AND gate 523 drives SYNCH to a de-asserted logic low state, which in turn causes control logic 810 to maintain SEL_SYNCH in its current logic state.

Operation of clock selection circuit 800, which is similar to the operation of clock selection circuit 500 of FIG. 5, is as follows. The current logic state of SEL_INL[1:0] determines which of the edge detection signals from edge detection circuits 821(0)–821(3) MUX 825(0) outputs to the first input of AND gate 523, and the current logic state of SEL_SYNCH[1:0] determines which of the edge detection signals from edge detection circuits 821(0)–821(3) MUX 825(1) outputs to the second input of AND gate 523. When the logic state of SEL_IN[1:0] is transitioned to select a new input clock signal to be output via MUX 830 as CLK, the resulting latched clock select signal SEL_INL[1:0] causes MUX 825(0) to output the edge detection signal from the one of edge detection circuits 821(0)–821(3) corresponding to the newly selected input clock signal to the first input of AND gate 523, while the current logic state of SEL_SYNCH[1:0] causes MUX 825(1) to output the edge detection signal from the one of edge detection circuits 821(0)–821(3) corresponding to the previously selected input clock signal to the second input of AND gate 523. Thus, if the rising edges of the previously selected input clock signal and the newly selected input clock signal are synchronous, the one of edge detection circuits 821(0)–821(3) corresponding to the newly selected input clock signal provides an asserted edge detection signal to the first input of AND gate 523 via MUX 825(0), and the one of edge detection circuits 821(0)–821(3) corresponding to the previously selected input clock signal provides an asserted edge detection signal to the second input of AND gate 523 via MUX 825(1). In response thereto, AND gate 523 asserts SYNCH to logic high, thereby causing MUXes 813(0) and 813(1) to update SEL_SYNCH[1:0] with the current value of SEL_INL[1:0], which in turn causes MUX 830 to output the newly selected input clock signal as CLK.

As described above with respect to the embodiment of FIG. 5A, clock selection circuit 800 switches the input clock selection only during a predetermined time period (e.g., approximately equal to the pulse width of OSC) after detection of synchronous rising edges of the previously selected input clock signal and the newly selected input clock signal, thereby ensuring that switching from the previously selected clock signal to the newly selected clock signal does not produce unwanted glitches in the output clock signal CLK without halting CLK.

Figure 9:
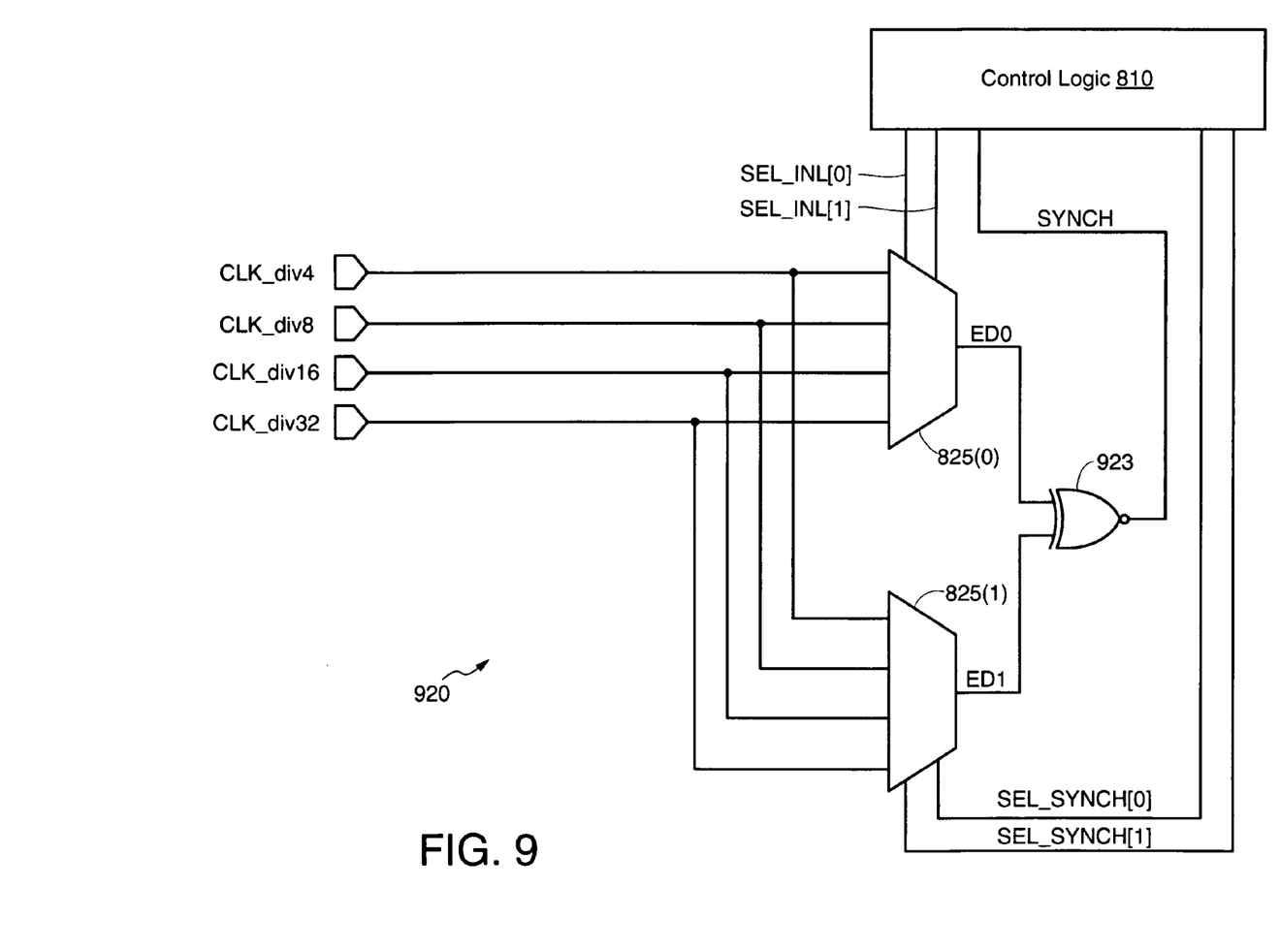
FIG. 9 is a more detailed block diagram of a modified embodiment of the edge detection logic of FIG. 8.

For other embodiments, edge detection circuits 821 may be eliminated to reduce circuit size. For example, FIG. 9 shows edge detection logic 920 that is a modified, asynchronous embodiment of edge detection logic 820 of FIG. 8. Edge detection logic 920 is similar to edge detection logic 820, except that edge detection circuits 821(0)–821(3) are eliminated, and the AND gate 523 is replaced by an XNOR gate 923. For simplicity, edge detection logic 920 is shown in FIG. 9 as receiving 4 clock input clock signals CLK_div4, CLK_div8, CLK_div16, and CLK_div32, for example, for use with control logic 810 of FIG. 8 to form a clock selection circuit in accordance with the present invention. For other embodiments, edge detection logic 920 may be configured to process other numbers of input clock signals.

For the embodiment of FIG. 9, the input clock signals CLK_div4, CLK_div8, CLK_div16, and CLK_div32 are provided directly to corresponding inputs of MUXes 825(0) and 825(1), and the outputs of MUXes 825(0) and 825(1) are provided to corresponding inputs of XOR gate 923. The output of XNOR gate 923 generates the SYNCH signal, which as described above with respect to FIG. 8 is provided to the control inputs of MUXes 813(0) and 813(1) of control logic 810. In operation, XNOR gate 923 asserts SYNCH to logic high (e.g., to allow the new state of SEL_IN to propagate to MUX 830 via control logic 810) if the newly selected input clock signal provided by MUX 825(0) in response to SEL_INL is in same logic state as the previously selected input clock signal provided by MUX 825(1) in response to SEL_SYNCH, and otherwise de-asserts SYNCH to logic low.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A clock selection circuit for selectively switching an output clock signal among a plurality of input clock signals in response to a clock select signal, comprising:
   an output multiplexer having inputs to receive the plurality of input clock signals, an output to provide the output clock signal, and a control terminal;
   edge detection logic having inputs to receive the plurality of input clock signals and having an output to generate a synchronization signal; and
   control logic having a first input to receive the clock select signal, a second input to receive the synchronization signal, and an output coupled to the control terminal of the output multiplexer;
   wherein the edge detection logic asserts the synchronization signal only when corresponding edges of a previously selected input clock signal and a newly selected input clock signal are synchronous.

2. The clock selection circuit of claim 1, wherein the control logic selectively propagates transitions of the clock select signal to the control terminal of the output multiplexer in response to the synchronization signal.

3. The clock selection circuit of claim 1, wherein the control logic further comprises a clock input to receive a first control clock signal, and the edge detection logic further comprises a clock input to receive a second control clock signal.

4. The clock selection circuit of claim 3, wherein the first control clock signal, the second control clock signal, and the plurality of input clock signals are derived from an oscillation signal.

5. The clock selection circuit of claim 4, wherein the second control clock signal comprises the oscillation signal.

6. The clock selection circuit of claim 4, wherein the second control clock signal has a frequency equal to twice the frequency of the first control clock signal.

7. The clock selection circuit of claim 3, wherein the control logic comprises:
   a first latch having a data input to receive the clock select signal, a clock input to receive the first control clock signal, and an output;
   a first multiplexer having a first input coupled to the output of the first latch, a second input coupled to the control terminal of the output multiplexer, and an output; and
   a second latch having a data input coupled to the output of the first multiplexer, a clock input to receive a complement of the first control clock signal, and an output coupled to the control terminal of the output multiplexer.

8. The clock selection circuit of claim 3, wherein the edge detection logic comprises:
   a logic gate having a first input to receive a first input clock signal, a second input to receive a second input clock signal, and an output to generate the synchronization signal.

9. The clock selection circuit of claim 8, wherein the logic gate performs a logical exclusive-NOR function.

10. The clock selection circuit of claim 3, wherein the edge detection logic comprises:
    a first edge detection circuit having a data input to receive a first input clock signal, a clock input to receive the second control clock signal, and an output;
    a second edge detection circuit having a data input to receive a second input clock signal, a clock input to receive the second control clock signal, and an output; and
    a logic gate having first and second inputs coupled to the outputs of the first and second edge detection circuits, respectively, and having an output to generate the synchronization signal.

11. The clock selection circuit of claim 10, wherein at least one of the edge detection circuits comprises:
    a first latch having a data input to receive a corresponding input clock signal, a clock input to receive the second control clock signal, and an output;
    a second latch having a data input coupled to the output of the first latch, a clock input to receive the second control clock signal, and an output; and
    a logic gate having a first input coupled to the output of the first latch, a second input coupled to the output of the second latch, and an output to generate an edge detection signal.

12. The clock selection circuit of claim 11, wherein the logic gate asserts the edge detection signal when a selected edge of the corresponding input clock signal is detected.

13. The clock selection circuit of claim 1, wherein the control logic comprises:
    a plurality of first latches, each having a data input to receive a corresponding bit of the clock select signal, a clock input to receive a first control clock signal, and an output;
    a plurality of first multiplexers, each having a first input coupled to the output of a corresponding first latch, a second input, and an output; and
    a plurality of second latches, each having a data input coupled to the output of a corresponding first multiplexer, a clock input to receive a complement of the first control clock signal, and an output to provide a corresponding bit of a synchronized clock select signal to the control terminal of the output multiplexer and to the second input of a corresponding first multiplexer.

14. The clock selection circuit of claim 13, wherein the input clock signals and the first control clock signal are derived from an oscillation signal.

15. The clock selection circuit of claim 13, wherein the edge detection logic comprises:
    a plurality of edge detection circuits, each having a data input to receive a corresponding input clock signal, a clock input to receive a second control clock signal, and an output;
    a second multiplexer having a plurality of inputs each coupled to the output of a corresponding edge detection circuit, a number of control terminals each coupled to an output of a corresponding first latch, and an output;
    a third multiplexer having a plurality of inputs each coupled to the output of a corresponding edge detection circuit, a number of control terminals each coupled to an output of a corresponding second latch, and an output; and
    a logic gate having first and second inputs coupled to the outputs of the second and third multiplexer, and having an output to generate the synchronization signal.

16. The clock selection circuit of claim 15, wherein the second multiplexer generates an edge detection signal for a newly selected input clock signal and the third multiplexer generates an edge detection signal for a previously selected input clock signal.

17. The clock selection circuit of claim 15, wherein at least one of the edge detection circuits comprises:
    a first latch having a data input to receive a corresponding input clock signal, a clock input to receive the second control clock signal, and an output;
    a second latch having a data input coupled to the output of the first latch, a clock input to receive the second control clock signal, and an output; and
    a logic gate having a first input coupled to the output of the first latch, a second input coupled to the output of the second latch, and an output to generate an edge detection signal.

18. The clock selection circuit of claim 13, wherein the edge detection logic comprises:
    a second multiplexer having inputs to receive the plurality of input clock signals, a number of control terminals each coupled to an output of a corresponding first latch, and an output;
    a third multiplexer having inputs to receive the plurality of input clock signals, a number of control terminals each coupled to an output of a corresponding second latch, and an output; and
    a logic gate having first and second inputs coupled to the outputs of the second and third multiplexer, and having an output to generate the synchronization signal.

19. The clock selection circuit of claim 18, wherein the logic gate performs a logical exclusive-NOR function.

20. A clock selection circuit for switching an output clock signal among a plurality of input clock signals in response to a clock select signal, comprising:

an output multiplexer having inputs to receive the input clock signals, an output to provide the output clock signal, and a control terminal to receive a synchronized clock select signal;

means for selectively updating the synchronized clock select signal with state changes in the clock select signal in response to a synchronization signal; and means for selectively asserting the synchronization signal if corresponding edges of a previously selected input clock signal and a newly selected input clock signal are synchronous.

21. The clock selection circuit of claim 20, wherein the means for selectively updating is clocked by a first control clock signal, and the means for selectively asserting is clocked by a second control clock signal.

22. The clock selection circuit of claim 21, wherein the means for selectively updating latches the clock select signal on a first edge of the first control clock signal and selectively updates the synchronized clock select signal on a second edge of the first control clock signal.

23. The clock selection circuit of claim 21, wherein the means for selectively asserting samples the input clock signals using first edges of the second control clock signal.

24. The clock selection circuit of claim 21, wherein the first control clock signal, the second control clock signal, and the input clock signals are derived from an oscillation signal.

25. The clock selection circuit of claim 24, wherein the second control clock signal comprises the oscillation signal.

26. The clock selection circuit of claim 24, wherein the second control clock signal has a frequency equal to twice the frequency of the first control clock signal.

27. The clock selection circuit of claim 24, wherein the means for selectively asserting asserts the synchronization signal for a time period equal to a pulse width of the oscillation signal.

28. A method for switching an output clock signal between first and second input clock signals in response to a clock select signal without halting the output clock signal, comprising:

providing the first and second clock signals to corresponding inputs of an output multiplexer;

receiving the clock select signal;

determining whether corresponding edges of the first and second input clock signals are synchronous;

selectively asserting a synchronization signal in response to the determining; and selectively propagating state changes in the clock select signal to a control terminal of the output multiplexer in response to the asserting.

29. The method of claim 28, wherein the selectively propagating comprises:

sampling the clock select signal on a first edge of a first control clock signal;

selectively updating a synchronized clock select signal with the state changes in the clock select signal in response to the synchronization signal; and providing the synchronized clock select signal to the control terminal of the output multiplexer on a second edge of the first control clock signal.

30. The method of claim 29, wherein the determining comprises:

sampling the first and second input clock signals using a second clock control signal; and selectively asserting first and second edge detection signals in response to the sampling.

31. The method of claim 30, wherein the first control clock signal, the second control clock signal, and the input clock signals are derived from an oscillation signal.

32. The method of claim 31, wherein the second control clock signal comprises the oscillation signal.

33. The method of claim 31, wherein the second control clock signal has a frequency equal to twice the frequency of the first control clock signal.

34. The method of claim 31, wherein the synchronization signal is asserted for a time period equal to a pulse width of the oscillation signal.

* * * * *